United States Patent
Brendel et al.

(10) Patent No.: US 7,138,154 B2
(45) Date of Patent: Nov. 21, 2006

(54) PROCESS FOR PREPARING A LOW-CALORIE FOOD

(75) Inventors: Raymond Brendel, Bethune (FR); Bernard Boursier, Violaines (FR); Patrick Leroux, Estaires (FR)

(73) Assignee: Roquette Freres, Lestrem (FR)

( * ) Notice: Subject to any disclaimer, the term of this patent is extended or adjusted under 35 U.S.C. 154(b) by 265 days.

(21) Appl. No.: 10/112,978

(22) Filed: Mar. 29, 2002

(65) Prior Publication Data
US 2002/0192344 A1 Dec. 19, 2002

(30) Foreign Application Priority Data
Mar. 30, 2001 (FR) .................................... 01 04415

(51) Int. Cl.
*A23L 1/236* (2006.01)
(52) U.S. Cl. ........................ 426/548; 426/549; 426/658
(58) Field of Classification Search ................ 426/548, 426/549, 658, 520, 523
See application file for complete search history.

(56) References Cited

U.S. PATENT DOCUMENTS

| | | | |
|---|---|---|---|
| 5,258,199 A | 11/1993 | Moore et al. | |
| 5,360,621 A | 11/1994 | Mentink et al. | |
| 5,466,471 A | 11/1995 | Yatka | |
| 5,589,215 A * | 12/1996 | Tang | 426/549 |
| 6,048,541 A | 4/2000 | Misra et al. | |
| 6,630,586 B1 * | 10/2003 | Fouache et al. | 536/103 |
| 6,767,576 B1 * | 7/2004 | Serpelloni | 426/658 |

FOREIGN PATENT DOCUMENTS

| | | |
|---|---|---|
| EP | 390 299 | 10/1990 |
| WO | WO 95 02969 | 2/1995 |

OTHER PUBLICATIONS

U.S. Appl. No. 09/455,009, filed Dec. 3, 1999, Catherine Fouache & al.

\* cited by examiner

*Primary Examiner*—Leslie Wong
(74) *Attorney, Agent, or Firm*—Young & Thompson

(57) ABSTRACT

The subject of the invention is a process for preparing a food product with reduced calorific value, comprising the step consisting in replacing all or part of the high-calorie substances of the food with an effective quantity, in terms of the reduction of the calorific value, of branched maltodextrins having between 15 and 35% of 1→6 glucoside linkages, a reducing sugar content less than 20%, a polymolecularity index of less than 5 and a number-average molecular mass $M_n$ at most equal to 4500 g/mol.

13 Claims, 1 Drawing Sheet

PROCESS FOR PREPARING A LOW-CALORIE FOOD

FIELD OF THE INVENTION

The subject of the present invention is a process for preparing food with reduced calorific value using a particular saccharide as substitute for high-calorie substances. Its subject is also low-calorie foods containing such a particular saccharide.

BACKGROUND OF THE INVENTION

In general, an increasing preoccupation of consumers with nutrition and the potential beneficial effects of foods is nowadays observed in industrialized countries. Several reasons may be advanced:

the worrying frequency of cancers and coronary diseases and the popularization of recent nutritional knowledge, the mistrust of consumers following the recent crises in the agri-foodstuffs industry, current demographic trends, which have seen an increase in number in the age range between 45 and 65 years, intensifies this desire for healthy products, which make it possible to live better and longer.

Accordingly, for many years, great efforts have been made to replace the high-calorie substances in traditional foods. Among them, the ones which are most expensive and with the highest calorie content are quite often sucrose and fat.

Sucrose has been, since the beginning of the food industry, the reference sweetener filler. Its sensory and technological properties make it particularly suited to food products.

On the other hand, its nutritional properties may give rise to criticisms. Indeed, sucrose possesses a calorific value of 4 Kcal/g, which confers on the food product, in which sucrose is the main constituent, a non-negligible calorific value.

In addition, it is known that sucrose is completely contraindicated for diabetics because its constituent glucose is rapidly assimilable by the body, which can generate serious hyperglycaemia in patients. Finally, sucrose is a substrate which can be fermented by commensal oral bacteria, which convert it to corrosive acids responsible for dental caries.

To overcome these disadvantages, it has been devised, for example, in the documents EP-A-0 390 299 and EP-A-0 512 910, to replace sucrose with polyols in some food products. These polyols may be in particular hydrogenated monosaccharides such as sorbitol, mannitol, xylitol, erythritol or hydrogenated disaccharides such as maltitol, lactitol, hydrogenated isomaltulose (equimolar mixture of 1,6-glucopyranosyl-sorbitol and 1,1-glucopyranosylmannitol).

In the pure state, these polyols have no reducing power and are not fermented by the oral flora to acids. They therefore allow the manufacture of noncariogenic food products since the other ingredients in the formulation do not supply fermentable sugars. In addition, polyols are slowly metabolized and do not cause, after their consumption, a sharp increase in the blood glucose level. Consequently, they are often recommended in the diet of diabetics.

Furthermore, the calorific value is estimated on average at 2.4 Kcal/g (10.0 KJ/g), that is about 60% that of sugar. However, as regards calorie reduction, it can only be observed that it still remains limited for foods containing polyols currently marketed, this being for the simple reason that to the calorific value of the sweetening mass is added the much higher one of fat which generally constitutes another main ingredient of food products.

This fat generally exists in the form of triglycerides. Its calorific value is 9 Kcal/g. Furthermore, it is essentially in saturated form. It is not therefore particularly recommended by nutritionists and goes against the current concern of consumers, which is to limit the excessive supply of calories by the diet.

To address this concern, it would therefore be advisable to replace all or part of the sucrose with a low-calorie substitute, but also to reduce all or part of the quantity of fat.

SUMMARY OF THE INVENTION

Having acknowledged this state of the art, the Applicants set themselves as an objective the development of a food product with a reduced calorific value, which, although having reduced contents of sucrose, fat and other high-calorie substances, would exhibit technological and organoleptic properties comparable to those of the same traditional food.

The expression comparable technological properties is understood to mean both the properties of the food obtained and the possibility of using conventional technology for its manufacture. The desired aim is in fact to dispense with, as far as possible, some of the implementation constraints such as a conditioned atmosphere, a sophisticated equipment and a long manufacturing time, and, on the other hand, technical difficulties such as water regain, poor rheological behaviour, or the limitation of certain parameters of the process for the manufacture of the food.

It is after numerous trials and studies that the Applicants have had the merit of finding that the objective defined above could be achieved provided a branched maltodextrin exhibiting very particular analytical parameters is used to constitute all or part of the high-calorie substances used in food.

DETAILED DESCRIPTION OF THE INVENTION

Figure 1:
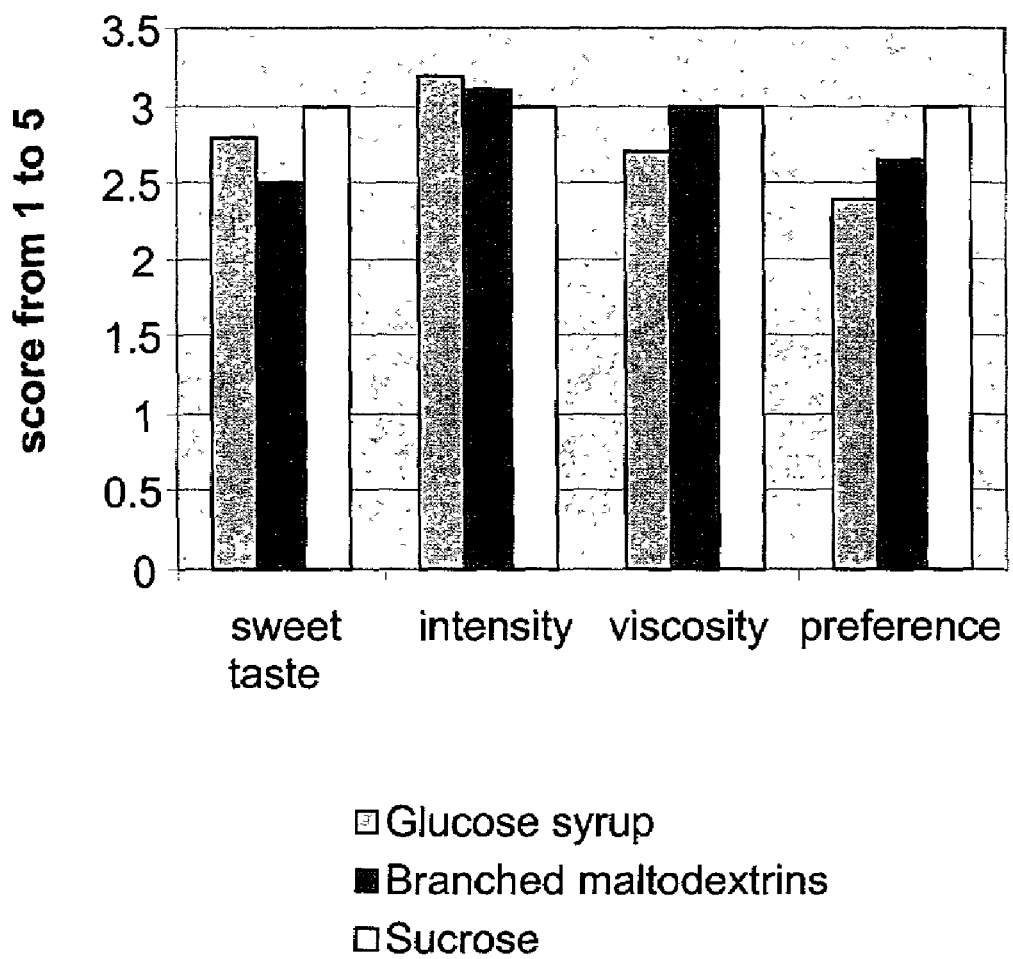
FIG. 1 shows the panel results for Example 3.

The subject of the present invention is therefore a process for preparing a food product with reduced calorific value, comprising the step consisting in replacing all or part of the high-calorie substances of the food with an effective quantity, in terms of the reduction of the calorific value, of branched maltodextrins having between 15 and 35% of 1→6 glucoside linkages, a reducing sugar content less than 20%, a polymolecularity index of less than 5 and a number-average molecular mass Mn at most equal to 4500 g/mol. The polymolecularity index is defined as the ratio of weight-average molecular mass over the number-average molecular mass.

The expression branched maltodextrins is understood to mean, for the purposes of the present invention, the branched maltodextrins described in Patent Application EP-A-1 006 128 of which the Assignee is proprietor and its US counterpart U.S. Ser. No. 09/455,009, now U.S. Ser. No. 6,630,586 the content of which is incorporated herein by reference. These branched maltodextrins exhibit an indigestibility character, the consequence of which is to reduce their calorific value, preventing their assimilation in the small intestine. Their low content of molecules with a low degree of polymerization ("DP") also contributes to their low calorific value. The determination of the calorific value for branched maltodextrins is carried out by calculation, from the evaluation of the portion represented by the fraction which is indigestible in the small intestine and which is fermented in the large intestine, considered here as supplying 2 Kcal/g. Branched maltodextrins thus have a deduced calorific value of less than 2.5 Kcal/g. Their high content of 1→6 glucoside linkages has the consequence of reducing their cariogenic effect by reducing their assimilation by the microorganisms of the buccal cavity. This high level of 1→6 linkages also confers quite specific prebiotic properties on them: it has indeed appeared that the bacteria of the caecum and of the colon in humans and animals, such as butyrogenic, lactic or propionic bacteria, metabolize highly branched compounds. Moreover, these branched maltodextrins promote the development of bifidogenic bacteria to the detriment of the undesirable bacteria. Properties which are completely beneficial to the health of the consumer result therefrom.

In the present invention, the expression "effective quantity with regard to the reduction of the calorific value" is understood to mean a quantity of branched maltodextrins sufficient to replace all or part of the high-calorie substances in a food product and thus to reduce the calorific value thereof, compared to the calorific value of a food product not containing such branched maltodextrins.

The high-calorie substances which may be replaced by branched maltodextrins comprise at least one component selected from the group consisting of sucrose, dextrose, lactose, glucose syrups, maltodextrins, fat, gelatin, milk proteins, gum arabic.

In the present invention, the expression "maltodextrins" is understood to mean the standard maltodextrins conventionally obtained by acid and/or enzymatic hydrolysis of starch, and characterized by a reducing power, expressed as Dextrose Equivalent (or DE), of less than 20.

Advantageously, the branched maltodextrins used in the present invention have a reducing sugar content of between 2 and 5% and an Mn of between 2000 and 3000 g/mol and all or some of them may be hydrogenated.

According to the type of food and of the desired organoleptic qualities, the branched maltodextrins are present in the food in a proportion of 0.1 to 30% by weight, and preferably 1.0 to 10% by weight, relative to the total weight of the food.

These branched maltodextrins may be jointly combined with 0.5 to 98% by weight, and preferably 5 to 98% by weight, relative to the total weight of the food, of at least one polyol selected from the group consisting of sorbitol, maltitol, xylitol, mannitol, erythritol, lactitol, hydrogenated isomaltulose, hydrogenated glucose syrups and hydrogenated starch hydrolysates.

According to another variant of the process in accordance with the present invention, the branched maltodextrins are simultaneously present with 0.5 to 98% by weight, and preferably 5 to 98% by weight, relative to the total weight of the food, of at least one sugar selected from the group consisting of xylose, fructose, glucose, polydextrose, sucrose, maltose, lactose, isomaltose, isomaltooligosacccharides, isomaltulose, glucose syrups, high-fructose glucose syrups, maltodextrins, fructooligosaccharides and galactooligosaccharides.

In the process in accordance with the present invention, it is also possible to add an intense sweetener selected from the group consisting, for example, of aspartame, alitame, acesulfame K, sucralose, stevioside, saccharin and cyclamate, alone or as a mixture. Preferably, the said intense sweetener is present in a quantity of 0.01 to 5% by weight, relative to the total weight of the food.

The foods in which all or part of the high-calorie substance may be replaced by branched maltodextrins, hydrogenated or otherwise and optionally in combination with one or more polyols and/or one or more sugars, are for example biscuits, chocolate, confectionery products, such as boiled sweets, jelly sweets, chewy pastes, chewing gums, tablets, gums, lozenges, chocolate confectioneries, chocolate bars, drinks, meal replacers, ice creams, spreads, cakes, bakery products, salad dressings and other foods usually containing high-calorie substances. The present invention also relates to a food product with a reduced calorific value, in which at most 75% by weight of the carbohydrates and/or all or part of the proteins and/or at most 50% by weight of the fat are replaced with branched maltodextrins having between 15 and 35% of 1→6 glucoside linkages, a reducing sugar content of less than 20%, a polymolecularity index of less than 5 and a number-average molecular mass Mn at most equal to 4500 g/mol, the said food having technological and organoleptic properties comparable to a traditional food product.

The sugars which can thus be replaced are, for example, sucrose, dextrose, lactose, maltose, fructose, glucose syrups, maltodextrins.

Thus, for example, excellent results were obtained with biscuits.

The phenomena which occur in a biscuit during its production, both during the mixing stages and the baking stages, are numerous and complex. They are closely dependent on the proportion of the various ingredients.

The flour of course constitutes the biscuit base, by supplying the starch which predominantly remains in the form of granules (given the low water content) and the proteins (gluten) which bring about the formation of the network. The fat, combined with an emulsifier, forms a dispersion throughout the dough, playing the role of binder between the other ingredients. This dispersion is responsible for the formation of nucleation sites for future air cells. On the other hand, the lipids adsorb at the surface of the bubbles and stabilize them during their growth. The fat is therefore crucial for the texture and the taste of the biscuits, since it also enhances the flavours. The sugar itself influences especially the mechanical properties of the biscuit (apart quite evidently from its organoleptic role). The size of the crystals and the proportion of crystalline and glassy sugar are influential factors with respect to the characteristics of tenderness, crispness and plasticity. Finally, sucrose, in the glassy state, has affinity for water which is greater than that of crystalline sucrose. The proportion of sucrose in the recipe therefore affects the content of free water, and consequently the mechanical properties of the biscuit.

After long trials, the applicants have obtained excellent results with a biscuit with a reduced calorific value, in which at most 40% by weight of the sugars and/or at most 40% by weight of the fat are replaced by branched maltodextrins representing between 15 and 35% of 1→6 glucoside linkages, a reducing sugar content of less than 20%, a polymolecularity index of less than 5 and a number-average molecular mass Mn at most equal to 4500 g/mol, the said biscuit having technological and organoleptic properties comparable to a traditional biscuit.

Above 40% replacement of the sugars, the sweet taste of the biscuit is no longer maintained. In the case of the fat, a replacement above 40% causes degradation of the properties of the dough and in particular its technological qualities (the dough blocks the rotary machine which makes it possible to form the biscuits).

Other characteristics and advantages of the present invention will emerge clearly on reading the examples which follow, which are given by way of illustration and without limitation.

EXAMPLE 1

Biscuit

Traditional biscuits and biscuits containing, on the one hand, branched maltodextrins and, on the other hand, FOSs (fructooligosaccharides), are prepared. The latter products are marketed under the name ACTILIGHT or RAFTILOSE.

Quantities per 100 g of dough:

| Ingredient (weight in grammes) | Reference | Biscuit according to the invention | Biscuit with FOS |
|---|---|---|---|
| Flour | 55.8 | 55.8 | 55.8 |
| Fat | 15.9 | 12.4 | 12.4 |
| Sucrose | 17.8 | 15.1 | 15.1 |
| Branched maltodextrins | 0 | 6.2 | 0 |
| FOS | 0 | 0 | 6.2 |
| Water | 9.3 | 9.3 | 9.3 |
| Ammonium bicarbonate | 0.3 | 0.3 | 0.3 |
| Sodium bicarbonate | 0.2 | 0.2 | 0.2 |
| Sodium pyrophosphate | 0.2 | 0.2 | 0.2 |
| Salt | 0.3 | 0.3 | 0.3 |
| Vanilla | 0.1 | 0.1 | 0.1 |
| Lecithin | 0.1 | 0.1 | 0.1 |

Procedure:
- Weigh the water, the ammonium bicarbonate and the sodium bicarbonate. Mix for 5 minutes in a Hobart kneader on speed 1.
- Add the fat and the soya bean lecithin, and stir for 1 minute on speed 1, and then for 4 minutes on speed 2.
- Weigh the rest of the powders (flour, sucrose, sodium hydrogen pyrophosphate, salt and vanilla flavour). Mix them, and then add them to the kneader. Stir for 10 minutes on speed 1, with one interruption to scrape the sides of the kneader and the stirring blade.
- Form the biscuits in a rotary moulder, and place them on a baking tray.
- Heat in a rotary oven at 200° C. for 10 minutes. The biscuits are always placed in the oven at the same height.
- Allow to cool to 25° C., and then store the biscuits in tins, so as to preserve their characteristics, in relation to water content in particular.
- Results of the Instrumental Measurements:

| Test | Reference | Biscuit according to the invention | Biscuit with FOS |
|---|---|---|---|
| Water activity | 0.205 | 0.223 | 0.133 |
| Water content (Karl Fisher) | 4.3% | 4.4% | 3.4% |
| Friability* | 23.3 | 23.3 | 23 |

*The friability is measured using an Instron-type apparatus. A conical punch is applied to the surface of the biscuit, so that a slight contact is established. The apparatus then imposes an increasing deformation, and measures the force exerted. When the punch penetrates into the biscuit, the force exerted gradually increases. If the punch meets an air space, a sharp reduction in this force occurs at the time the wall is ruptured. The friability can therefore be estimated bythe number of peaks in the variation of the force exerted. For this study, only the peaks between a movement of 0 and 2 mm were counted so as not to achieve the rupturing of the biscuit.

Results of the Sensory Analysis: Panel of 12 Subjects

The scores correspond to an evaluation on a scale of 0 to 7 for the appearance, the colour and the sugar.

The calorific value of the biscuits is calculated using the calorific values of each ingredient.

For the branched maltodextrins, a calculated calorific value of 2 Kcal/g will be used.

For the FOSs, the calorific value is 2 Kcal/g.

| Test | Reference | Biscuit according to the invention | Biscuit with FOS |
|---|---|---|---|
| Appearance | 4.815 | 3.285 | 2.715 |
| Colour | 5.7 | 4.425 | 2.85 |
| Sugar | 3.80 | 3.08 | 3.89 |
| Calorific value (Kcal/100 g) | 464 | 429 | 429 |

These results show that the biscuits according to the invention are preferred to the older biscuits with reduced calorific value.

EXAMPLE 2

Cereal Bars

Cereal bars are prepared with glucose syrup (control) or by replacing part of this syrup with branched multidextrins so as to reduce the calorific value of the bars.

Binding Caramel Recipe

| | CONTROL | | TRIAL ACCORDING TO THE INVENTION | |
|---|---|---|---|---|
| | INGREDIENTS USED (by weight) | COMPOSITION OF THE PRODUCT FINISHED (%) | INGREDIENTS USED (by weight) | COMPOSITION OF THE PRODUCT FINISHED (%) |
| Powdered milk | 101 | 10.6 | 101 | 10 |
| Sucrose | 300 | 33.5 | 300 | 32 |
| Branched maltodextrins | — | — | 126 | 12.7 |
| NaCl | 4 | 0.4 | 4 | 0.4 |
| Water | 83 | — | 40 | — |
| NEOSORB 70/70* | 100 | 7.8 | 118 | 8.8 |
| FLOLYS E70815* | 233 | 21.1 | 132 | 11 |
| VF** COSE | 174 | 19.4 | 174 | 18 |
| Soya bean lecithin | 5 | 0.6 | 5 | 0.5 |
| Residual moisture | — | 6.5 | — | 6.6 |
| Total | 1000 | 100 | 1000 | 100 |

*Marketed by the applicant
**Vegetable fat

Procedure
- Mix the whole milk powder with sucrose (M1).
- Mix the water, the NEOSORB 70/70 and the FLOLYS E7081S (M2).
- Mix the vegetable fat (previously melted at 50° C.), the lecithin and the branched maltodextrins (M3).
- With stirring, add the mixture M1 to the mixture M2 and then boil on a low fire until 110° C. is reached.
- When the temperature of 110° C. is reached, gradually pour the mixture M3.

A drop in temperature (about 5° C.) and an increase in the viscosity of the final mixture are then observed.

Still on a low fire and with vigorous stirring, boil the final mixture until 126° C. is reached for the control and 110° C. for the trial according to the invention.

Mix the caramel with the cereals, observing the prescribed proportions (75/25).

Pour on a slab

Cool, cut, wrap.

Characterization of the Caramels

|  | Aw at 20° C. | Water content (%) | Calorific value (Kcal/100 g) |
|---|---|---|---|
| Control caramel | 0.45 | 6.5% | 470 |
| Caramel according to the invention | 0.46 | 6.6% | 435 |

Calorific values used for the calculations:
Branched maltodextrins: 2 Kcal/g
Sucrose, FLOLYS E 70: 4 Kcal/g
NEOSORB 70/70: 2.4 Kcal/g
Lecithin, VF: 9 Kcal/g
Milk powder: 5 Kcal/g.

The reduction in the calorific value of the binding caramels according to the invention is 7%.

EXAMPLE 3

Preparation of Fizzy Soft Drinks

Fizzy soft drinks containing, on the one hand, sucrose, and, on the other hand, a glucose syrup and branched maltodextrins as a complete substitute for sucrose, are prepared.

Quantities in grammes per 1 liter of drink:

|  | Control (sucrose) | Trial 1 (glucose syrup) | Trial 2 (according to the invention) |
|---|---|---|---|
| Sucrose | 100 |  |  |
| Glucose syrup |  | 86.42 |  |
| Branched maltodextrins |  |  | 73.68 |
| Aspartame |  | 0.078 | 0.118 |
| Acesulfame K |  | 0.078 | 0.118 |
| Lemon flavour | 0.7 | 0.7 | 0.7 |
| Citric acid (dry) | 1.9 | 1.9 | 1.9 |
| Sodium benzoate (dry) | 0.09 | 0.09 | 0.09 |
| Carbonated water at 4° C. | q.s. 1l | q.s. 1l | q.s. 1l |

Sucrose: sieved manufacturer's sugar (BEGHIN-SAY)
Glucose syrup: FLOLYS®E7081S
Aspartame: NUTRASWEET
Acesulfame K: HOESCHT
Lemon flavour: AG 31711 (QUEST)

The branched maltodextrins represent between 15 and 35% of 1→6 glucoside linkages, a reducing sugar content of between 2 and 5%, a polymolecularity index of less than 5 and a number-average molecular mass Mn of between 2000 and 3000 g/mol:

| Reducing sugars | 2.3 |
|---|---|
| Mn (g/mol) | 2480 |
| Mw (g/mol) | 5160 |
| 1,2 linkage (%) | 10 |
| 1,3 linkage (%) | 12 |
| 1,4 linkage (%) | 49 |
| 1,6 linkage (%) | 29 |

0.5 liters of aerated water is prepared. The sweeteners and/or the sugar or the sugar substitute are then added. The remainder of the ingredients are then incorporated and water is added to a volume of 1 liter. The drinks obtained are stored in the refrigerator, before being submitted to a taste panel.

A panel of 8 people carry out an evaluation, on the three drinks, of the following criteria:

sweet taste flavour intensity viscosity in the mouth preference

Each criterion is classified on a scale from 1 to 5 in comparison with the sucrose control.

The results are represented in FIG. 1. It is observed that no significant difference appears between the three drinks. It appears that the drinks according to the invention are however preferred to those containing the glucose syrup as sucrose substitute.

The replacement of the sugar or of the glucose syrup with the branched maltodextrins according to the invention therefore makes it possible to reduce their calorific value without impairing their taste. Indeed, the calorific value of these three drinks is the following:

Control (sucrose): 400 Kcal/l

Trial 1 (glucose syrup): 280 Kcal/l

Trial 2 (invention): 140 Kcal/l

EXAMPLE 4

Preparation of a Mayonnaise

A standard mayonnaise containing 77.5% oil and a low-calorie mayonnaise containing 25% of oil comprising increasing levels of branched maltodextrins as fat substitute are prepared.

The formulas are the following:

|  | STANDARD MAYONNAISE | MAYONNAISE 1 ACCORDING TO THE INVENTION | MAYONNAISE 2 ACCORDING TO THE INVENTION | MAYONNAISE 3 ACCORDING TO THE INVENTION |
|---|---|---|---|---|
| MAIZE OIL | 77.5 | 25 | 25 | 25 |
| STARCH PREGEFLO ® | 0.5 | 4.25 | 4.25 | 4.25 |

-continued

|  | STANDARD MAYONNAISE | MAYONNAISE 1 ACCORDING TO THE INVENTION | MAYONNAISE 2 ACCORDING TO THE INVENTION | MAYONNAISE 3 ACCORDING TO THE INVENTION |
|---|---|---|---|---|
| CH20 |  |  |  |  |
| SALT | 2 | 2 | 2 | 2 |
| MUSTARD | 3 | 3 | 3 | 3 |
| EGG YOLK | 5 | 5 | 5 | 5 |
| VINEGAR 6% | 10 | 10 | 10 | 10 |
| SUCROSE | 2 | 2 | 2 | 2 |
| BRANCHED MALTODEXTRINS | 0 | 0 | 5 | 10 |
| WATER | — | 48.75 | 43.75 | 38.75 |

Procedure: in the bowl of a KENWOOD mixer, the water and the branched maltodextrins, where appropriate, are mixed. The salt, the sugar, the vinegar, the mustard and the egg yolks are successively added.

The stirring is carried out at the maximum speed of the mixer. Half of the oil is then introduced, followed by the other half containing the dispersed starch.

The mixing is carried out for 2 minutes and the mixture is placed in pots.

Results: The control without branched maltodextrins has little body. With 5% of branched maltodextrins, the mayonnaise has more body and a more fatty appearance. With 10% of branched maltodextrins, the mayonnaise is comparable to the standard mayonnaise and with a lot of body and a very fatty appearance.

The branched maltodextrins according to the invention are therefore completely suited to the preparation of low-fat mayonnaise.

EXAMPLE 5

Replacement of Fat in a Cereal Bar

Cereal bars are prepared according to the same procedure as in Example 2, but with a binding caramel recipe in which part of the fat is replaced with the branched maltodextrins according to the invention.

Formula:

| Ingredients used in the binder | Control bar | Bar according to the invention |
|---|---|---|
|  | (% by mass) | |
| Vegetable fat (Loders Croklaan Cose) | 16.90 | 12.90 |
| Soya bean lecithin | 1.50 | 1.50 |
| Branched maltodextrins | 0 | 4.22 |
| Whole milk powder (Ingredia) | 10 | 10 |
| Sucrose | 25 | 25 |
| NaCl | 0.4 | 0.4 |
| Water | 9 | 8.79 |
| Glucose syrup (FLOYS ® E7081S) | 37.20 | 37.20 |
| TOTAL | 100 | 100 |
| Calorific value (on a dry basis) | 435 Kcal/100 g | 426 Kcal/100 g |

Observations: No significant difference in terms of appearance and taste was observed between the control and the bars according to the invention, except that the bars according to the invention were found to be more crisp than the control: it is therefore possible to replace the fat in the control without damaging the final quality of the bars. It is entirely possible to envisage, in the context of the present invention, replacing several ingredients at the same time, that is to say all or part of the sugar and the fat.

EXAMPLE 6

Preparation of Bread

A traditional bread is prepared in which a portion of the flour is replaced by branched maltodextrins.

Formula:

|  | CONTROL (composition by weight) | COMPOSITION ACCORDING TO THE INVENTION (composition by weight) |
|---|---|---|
| WHEAT FLOUR | 100 | 93.5 |
| BRANCHED MALTODEXTRINS | 0 | 6.5 |
| SOLID FAT | 4 | 4 |
| WHEAT GLUTAN | 1 | 1 |
| MALT FLOUR | 0.1 | 0.1 |
| SALT | 2.3 | 2.3 |
| FRESH YEAST | 2.5 | 2.5 |
| AMYLASES | 0.013 | 0.013 |
| ASCORBIC ACID (solution at 1%) | 0.3 | 0.3 |
| WATER | 60 | 60 |

Procedure: The fat is melted and there are added (according to the invention) the branched maltodextrins, with stirring, and then the mixture is placed in a cold place in order to cause the fat to harden. The various ingredients are then introduced into a kneader. The mixture is kneaded for 4 minutes on speed 1 and then for 19 minutes on speed 2.

The dough obtained is placed in a proof box at 23° C. and 80% relative humidity for 45 minutes. It is then cut, weighed, shaped and then placed in a proof box at 23° C. and 80% relative humidity for 1 h 30 min to 1 h 45 min.

The dough is then baked in an oven at 250° C. for 20 to 30 minutes.

A truly white bread of good organoleptic quality is obtained according to the invention.

The invention claimed is:

1. A biscuit comprising sugars and/or fat, with an amount of sugar and an amount of fat replaced, wherein at most 40% by weight of sugar is replaced and wherein at most 40% by weight of fat is replaced, with a sugar and fat replacement consisting essentially of 0.1 to 30% by weight based on the total weight of biscuit, by branched maltodextrins representing between 15 and 35% of 1→6 glucoside linkages, a reducing sugar content of less than 20%, a polymolecularity index of less than 5 and a number-average molecular mass Mn at most equal to 4500 g/mol, and whereby a reduced calorie biscuit having technological and organoleptic properties comparable to a conventional biscuit is obtained.

2. The biscuit according to claim 1, wherein said branched maltodextrins have a reducing sugar content between 2 and 5% and an Mn of between 2000 and 3000 g/mol.

3. The biscuit according to claim 1, wherein all or some of the branched maltodextrins are hydrogenated.

4. The biscuit according to claim 1, further comprising a high-calorie substance containing at least one component selected from the group consisting of sucrose, dextrose, lactose, maltose, fructose, glucose syrups, maltodextrins, fat, proteins, and gum arabic.

5. The biscuit according to claim 1, wherein said branched maltodextrins are present in a proportion of 1.0 to 10% by weight, relative to the total weight of the food.

6. The biscuit according to claim 1, wherein said branched maltodextrins are simultaneously present with 0.5 to 98% by weight, relative to the total weight of the food product, of at least one polyol selected from the group consisting of sorbitol, maltitol, xylitol, mannitol, erythritol, lactitol, hydrogenated isomaltulose, hydrogenated glucose syrups and hydrogenated starch hydrolysates.

7. The biscuit according to claim 1, wherein said branched maltodextrins are simultaneously present with 0.5 to 98% by weight, relative to the total weight of the food, of at least one sugar selected from the group consisting of xylose, fructose, glucose, polydextrose, sucrose, maltose, lactose, isomaltose, isomalto-oligosaccharides, isomaltulose, glucose syrups, high-fructose glucose syrups, maltodextrins, fructo-oligosaccharides and galactooligo-saccharides.

8. The biscuit according to claim 1, wherein said branched maltodextrins have a reducing sugar content between 2 and 5% and an Mn of between 2000 and 3000 g/mol.

9. The biscuit according to claim 1, wherein all or some of the branched maltodextrins are hydrogenated.

10. The biscuit according to claim 1, further comprising a high-calorie substance containing at least one component selected from the group consisting of sucrose, dextrose, lactose, maltose, fructose, glucose syrups, maltodextrins, fat, proteins, and gum arabic.

11. The biscuit according to claim 1, wherein said branched maltodextrins are present in a proportion of 1.0 to 10% by weight, relative to the total weight of the biscuit.

12. The biscuit according to claim 1, wherein said branched maltodextrins are simultaneously present with 0.5 to 98% by weight, relative to the total weight of the biscuit, of at least one polyol selected from the group consisting of sorbitol, maltitol, xylitol, mannitol, erythritol, lactitol, hydrogenated isomaltulose, hydrogenated glucose syrups and hydrogenated starch hydrolysates.

13. The biscuit according to claim 1, wherein said branched maltodextrins are simultaneously present with 0.5 to 98% by weight, relative to the total weight of the biscuit, of at least one sugar selected from the group consisting of xylose, fructose, glucose, polydextrose, sucrose, maltose, lactose, isomaltose, isomalto-oligosaccharides, isomaltulose, glucose syrups, high-fructose glucose syrups, maltodextrins, fructo-oligosaccharides and galactooligo-saccharides.

* * * * *